United States Patent
Reese

[19]

[11] Patent Number: 5,949,739
[45] Date of Patent: Sep. 7, 1999

[54] SONAR BEARING ESTIMATION OF EXTENDED TARGETS

[76] Inventor: Sudha S. Reese, 29 Weetamoe La., Portsmouth, R.I. 02871

[21] Appl. No.: 07/091,473

[22] Filed: Aug. 31, 1987

[51] Int. Cl.$^6$ .................................................. G01S 15/00
[52] U.S. Cl. .............................................................. 367/100
[58] Field of Search .................................. 367/99, 100, 7, 367/125

[56] References Cited

U.S. PATENT DOCUMENTS 4,686,655   8/1987   Hyatt ........................................ 367/59

Primary Examiner—Daniel T. Pihulic

[57] ABSTRACT

An improved bearing estimation sonar system provides high resolution imaging of extended multi-highlight targets at long ranges. The complex outputs of a pair of offset-phase centered beams are first processed by segmented replica correlators to achieve pulse compression, followed by cross-correlation to provide high fidelity bearing estimates for target imaging. The technique exploits space-time coherence properties of the target receive signal to extract high resolution target information. The processing employed in the system also includes data editing schemes resulting in enhanced discernability of submarine-like targets which is essential for target classification. Substantial processing gains are realizable by the system of this invention.

11 Claims, 4 Drawing Sheets

SONAR BEARING ESTIMATION OF EXTENDED TARGETS

BACKGROUND OF THE INVENTION

This invention relates to active target classification and more particularly to the apparatus and method for obtaining improved bearing estimation of extended targets.

Range-bearing maps of signal returns are often used for extracting information about the target aspect shape and length. Target imaging for such feature extraction tasks is usually done with high frequency sonars using high spatial resolution beams and short continuous wave pulses. However, the absorption losses at high frequency attenuate the signal rapidly and preclude long range operations. To overcome these problems, detection sonars use low frequency in conjunction with large time bandwidth (WT) signal waveforms such as linear frequency modulated waveforms. The rationale for using the large WT waveforms is when the signal returns are processed through a matched filter, the desired target echo is emphasized, while the effect of noise is minimized. This results in enhancement of the signal-to-noise ratio (SNR) needed for detection and estimation of target parameters. The lack of adequate range resolution causes the sonar echo to be a composite of overlapping returns which tend to interfere with each other. As a result, signal returns from a multi-highlight target in a multipath environment encounter amplitude scintillations. Bearing estimation in such cases is accompanied by large variances called "glint error" in addition to angle error due to additive noise. This invention describes a signal processing technique which overcomes these problems by optimal combination of temporal and spatial processing to extract accurate range-bearing estimates for target imaging.

There exists the need for improvements in active target classification capability of sonar systems which are presently available. Of fundamental importance to the classification task is the extraction of information about the target aspect, shape, and length. Suggested systems for providing this information use high resolution pulse compression and split beam processing to provide information to a two-dimensional display of range versus cross range of the target in a 500 yard to 1000 yard window. The basic limitation of this prior art processing is the bearing estimation of the extended target which provides sonar signals having multiple highlights in a multipath environment. Bearing estimation in observing such targets is accompanied by "glint error" due to interference among the multiple returns, in addition to angle error due to noise.

The conventional prior art approach of high resolution bearing estimation is shown in FIG. 1. FIG. 1 shows a system 10 in which a sonar array 11 of transducers provides, in a manner well known to those skilled in the art, phase separated beams 12, 13 with aperture spacing D which provide target and noise signals $S(t)+N_1(t)$, $S(t+t_0)+N_2(t)$, respectively, on lines 14, 15. The signals on lines 14, 15 are applied to their respective matched filters (replica correlators) 16, 17 which provide correlated complex output signals $C_R$, $C_L$, respectively. The complex signals $C_R$, $C_L$ correspond to the signals provided by the right and left phase-center displaced beams 12, 13, respectively. Cross correlation of the complex signal $C_R$ with the complex conjugate ($C_L^*$) of signal $C_L$ in the cross correlator 18 provides the real part of the cross correlated $C_R$, $C_L^*$ signals on line 19 and the imaginary part of the cross correlated $C_R$, $C_L^*$ signals on line 20. The real and imaginary signals are applied as inputs to an arc tangent circuit 21 which operates on the ratio of the imaginary to the real part of the output of cross-correlator 18 to provide the phase angle ø (the argument) on line 22. The phase angle ø is converted to a bearing Θ in converter 23 by dividing the angle ø by the Horton phase factor ($2\pi D/\lambda$) where D is the phase center separation of the beams 12, 13 and λ is the average wavelength of the sonic energy which is received in the beams 12, 13. The cross range value is provided on line 24 by multiplication of the bearing Θ by the range of the corresponding signal within converter 23 thereby providing an electrical signal to the X axis deflection circuitry to provide the cross range deflection on the range/cross range display unit 25.

A system trigger causes the transmitter 26 to initiate a linear frequency sonic signal for propagation by the transducer array 11 to provide acoustic energy over a region to which the phase displaced beams 12 and 13 are responsive to reflected signals. The system trigger is also provided to initiate a Y axis deflection circuit 27 which provides a range ramp voltage to the Y deflection circuitry of the range versus cross range display 25. The real part and imaginary part of the signals on lines 19 and 20, respectively, are provided to an amplitude generating circuit 28 which takes the square root of the sum of the squares of the real and imaginary parts of the signals on lines 19 and 20 to obtain the magnitude of the received signal. The output of amplitude generating circuit 28 is provided to a detector 29 to which a threshold voltage is also applied. When the magnitude of the signal provided by circuit 28 exceeds the threshold, an output voltage is provided on line 30 which provides an intensification signal to the display 25. Where the display 25 is a cathode ray tube display, the intensification signal would be provided to a grid controlling the electron beam striking the face of the cathode ray tube. For each signal detected by detector 29, a spot would appear on the face of the display 25 with the Y and X location of the spot being determined by the range and cross range provided by circuits 23 and 27. A typical display provided by the prior art circuitry will be presented later as FIG. 6 for comparison with displays provided by the system of this invention.

SUMMARY OF THE INVENTION

This invention relates to an improved bearing estimation sonar system which provides high resolution imaging of extended multi-highlight targets at long ranges. The complex outputs of a pair of offset-phase centered beams are first processed by segmented replica correlators to achieve pulse compression, followed by cross-correlation to provide high fidelity bearing estimates for target imaging. The technique exploits space-time coherence properties of the target receive signal to extract high resolution target information. The processing employed in the system also includes data editing schemes resulting in enhanced discernability of submarine-like targets which is essential for target classification. Substantial processing gains are realizable by the system of this invention.

BRIEF DESCRIPTION OF THE DRAWINGS

The aforementioned aspects and other features of the invention are explained in the following description taken in conjunction with the accompanying drawings wherein.

DESCRIPTION OF THE PREFERRED EMBODIMENT

Figure 1:
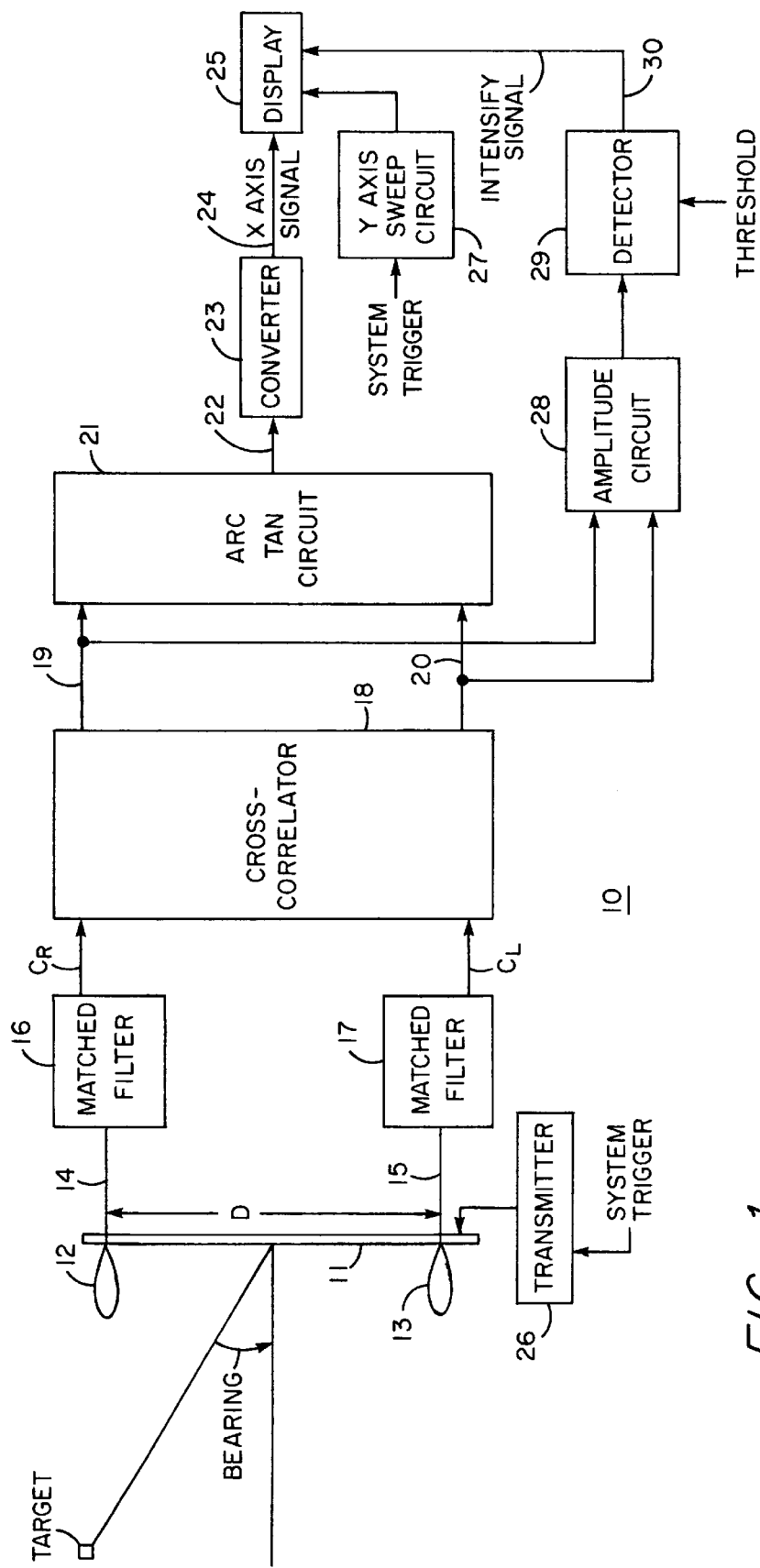
FIG. 1 is a block diagram of a prior art sonar classification system.
Figure 2:
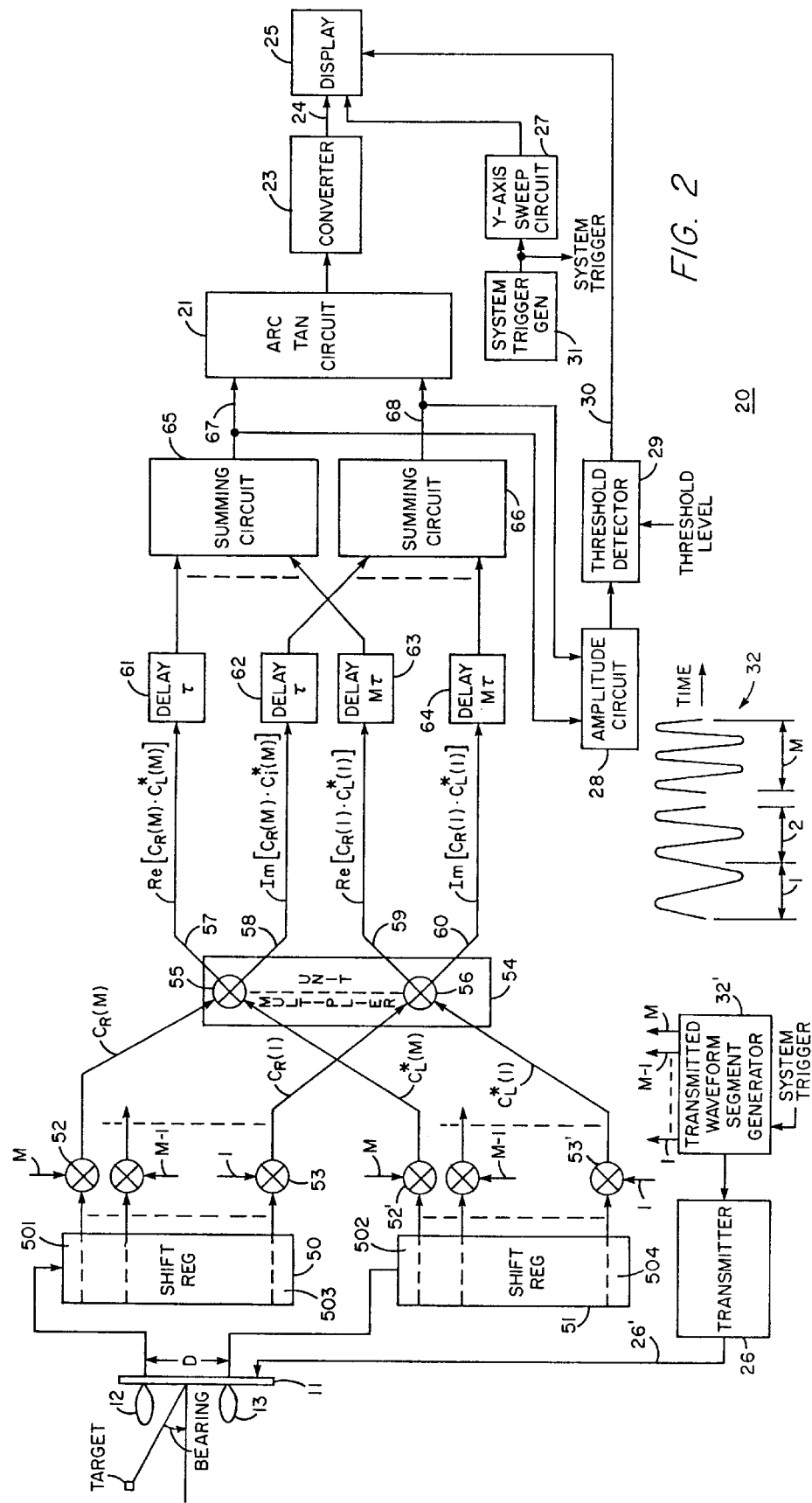
FIG. 2 is a block diagram of the sonar classification system of this invention.

Referring now to FIG. 2, there is shown a block diagram of the system 20 of this invention. Like elements and corresponding signals and lines will be numbered in accordance with the numbering utilized in FIG. 1. The signals provided by the left-half and right-half phase displaced beams 12, 13, respectively, are provided to segmented replica correlators comprising shift registers 50, 51 and multipliers 52-53, 52'-53', respectively. The shift registers 50, 51 store received signals in the form of digital signals in blocks of 1 through M segments. The time required to shift a sampled signal through the shift registers 50, 51 corresponds to the time duration of a linear frequency-modulated transmitted signal 32 which consists of M segments, each of the same time duration or period. A sequence of digital signals corresponding to the time-varying amplitude of the transmitted signal during a particular segment 1, 2, ... M−1, M is repetitively applied to a different multiplier 52. As shown in FIG. 2, the waveform segment M is repetitively applied as one input to the multipliers 52, 52', each of whose other input is the digital signal produced by beams 12, 13 in the registers of the first segment 501, 502 of the shift registers 50, 51, respectively. In like manner, the received signal from beams 12, 13 which are stored in the registers of the last segment 503, 504 of registers 50, 51, is multiplied in multipliers 53, 53' by a signal from segment generator 32' corresponding to that of segment 1 of the transmitted signal 32. Thus, each segment of the shift registers 50, 51 stored signals are multiplied in separate multipliers 52-53, 52'-53' by the corresponding segment 1, 2, ... M of the transmitted signal for each of the M segments of received signals of beams 12, 13 stored in shift registers 50, 51. The operation of the shift registers 50, 51 and the multipliers 52-53, 52'-53' corresponds to the operation of segmented replica correlators as is known to those skilled in the art.

Thus, the received signal from the right-half phase displaced beam 13 is applied as digital signals to the storage cells 1, 2, ... M, of shift register 51. As in shift register 50, the register 51 is divided into M segments there being an output from each segment applied to multipliers 52'-53' corresponding to the multipliers 52, 53.

The complex outputs $C_R(m)$, $1 \leq m \leq M$, of multipliers 52-53 and the complex conjugate $C_L^*(m)$, are provided as inputs to multipliers 55-56 of the M multiplier unit 54. As an illustration, the output signals from multipliers 52, 52' each having inputs connected to the Mth block of registers 50, 51, respectively, and to the Mth segments of the segment generator 32', are provided as correlated signals $C_L^*(M)$ and $C_R(M)$ to the multiplier 55 of the multiplier unit 54. Similarly, the outputs of multipliers 53, 53' corresponding to the correlated signals $C_L^*(1)$, $C_R(1)$ of segment 1 of the transmitted signal are applied as inputs to multiplier 56 of the multiplier unit 54. The output of each multiplier 55-56, and the other multipliers of unit 54, each provide a real component $Re[C_R(M) \cdot C_L^*(M)]$ of the product $C_R(M) \cdot C_L^*(M)$ and an imaginary part $Im[C_R(M) \cdot C_L^*(M)]$ on lines 57, 58, respectively, for the Mth segment of the transmitted signal. The asterisk represents the complex conjugate of $C_L(M)$. Similarly, multiplier 56 provides the real and imaginary parts, respectively, of the product $C_R(1) \cdot C_L^*(1)$ on lines 59, 60, respectively. The real and imaginary components provided by multiplier 55 are provided to delay lines 61, 62, respectively, each having a delay time of τ whereas the real and imaginary signals on lines 59, 60 are provided respectively to delay lines 63, 64, each of which have a delay Mτ. Thus, the segments of the transmitted waveform are appropriately delayed in the received signal in order to provide pulse compression.

The appropriately delayed outputs of the real parts of the products $C_R \cdot C_L^*$ are provided as inputs from delay units 61–63 as inputs to summing circuit 65. The imaginary portions of the products $C_R \cdot C_L^*$ outputs of the multipliers 55–56 of multiplier unit 54 after being appropriately delayed in delay units 62–64 are provided as inputs to summing circuit 66. The outputs 67, 68 of summing circuits 65, 66 are provided as inputs to circuit 21 which provides the argument or arc tangent of the ratio of the imaginary to the real part of the outputs 67, 68 of the summing circuits 65, 66. The output of arc tangent circuit 21 is converted to a cross bearing by converter 23 by dividing its input phase angle ø by the Horton phase factor quantity 2πD/λ and multiplying by the range to the respective target producing the signal.

The cross bearing output of converter 23 is applied as the X axis drive of display unit 25. The real and imaginary components on lines 67 and 68 are converted into an amplitude by taking the square root of the sum of their squares in amplitude circuit 28. The output of circuit 28 is provided to threshold detector 29 having a threshold level applied to it to provide a signal on line 30 when the amplitude of a received signal provided by circuit 28 exceeds the threshold level. The signal appearing on line 30 is applied to the intensity modulation control of the display 25. The system trigger generator 31 initiates a ramp voltage which is generated by the Y axis sweep circuit 27 which is applied to the Y axis of the display 25. Thus, a detected signal will be at a range displayed as a Y axis deflection on display 25 provided by circuit 27 and by a bearing (or cross-range) by the X axis deflection provided by the voltage on line 24 provided by the arc tangent angle converter 23. The system trigger 31 also initiates the modulation generator 32 which provides a drive signal such as the modulated signal 32 to the transmitter 26 which is connected to the array 11 through line 27 to insonify the area which is being received by the beams 12, 13. Segment generator 32' operates to provide continuous repetition of segments 1, 2, ... M.

Figure 3:
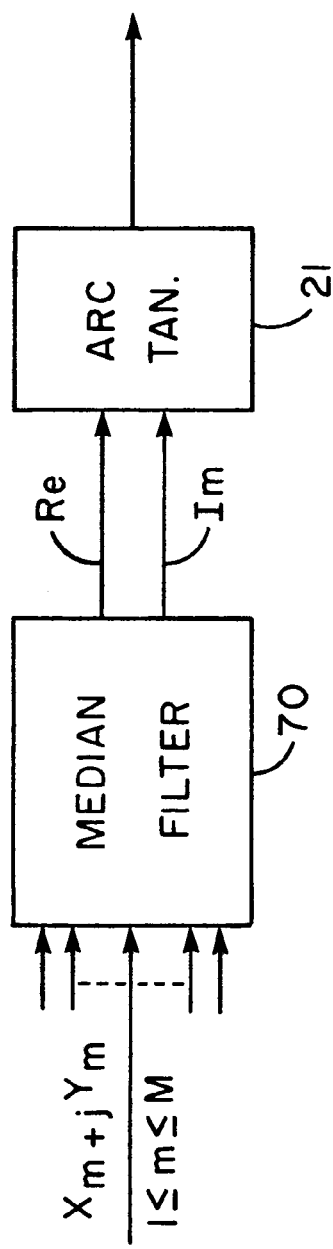
FIGS. 3 and 4 are block diagrams of alternate signal filters.

The circuits 65, 66 have been described as summing circuits in which the real and imaginary parts, respectively, of the cross-correlated received signals are added after being appropriately delayed to provide pulse compression of the received signal from a frequency modulated transmitted signal. FIG. 3 shows a modification of the summing circuitry 65, 66 of FIG. 2 wherein the summing circuits are replaced with a median filter 70 which operates on the real and imaginary outputs $X_m + jY_m$ of multiplier 54 to obtain the median value of the real parts and the median value of the imaginary parts prior to providing these appropriately delayed real and imaginary parts to the arc tangent circuit 21 of FIG. 2.

Figure 4:
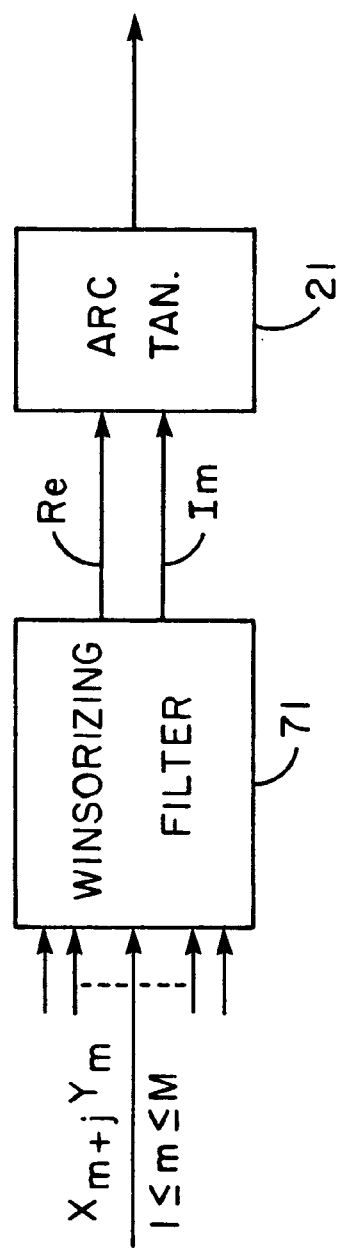

Another variation of summing circuits 65, 66 of FIG. 2 wherein the circuits are replaced by a "Winsorizing" filter 71 is shown in FIG. 4. The Winsorizing filter operates on the real and imaginary signals $Y_m + jY_m$ from each multiplier 55, 56 of multiplier unit 54 by discarding those signals farthest removed from the peak of a probability distribution curve of the argument of each of the real and imaginary parts of each of the signals $Y_m+jY_m$ provided by the delay units 61–64. For example, if the transmitted signal had five segments (M=5), the multiplier unit 54 would provide five pairs of real and imaginary parts $X_1+jY_1, \ldots X_5+jY_5$ of the received signal. Each pair would have its argument determined in the Winsorizing filter by taking the ratio of the imaginary to the real part. The Winsorizing filter takes the center three and discard the outermost two signals. The remaining three signals would have their real and imaginary parts added prior to being provided on lines 67, 68 to the arc tangent circuit 21.

It will be apparent that other types of filtering other than those described could be utilized in order to smooth and edit the raw data.

Figure 5:
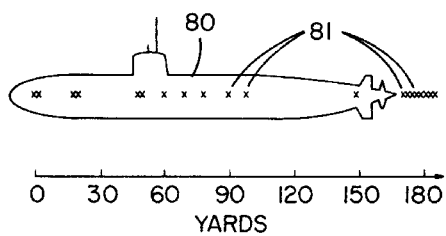
FIG. 5 is a pictorial view of a multi-highlight extended target.
Figure 7:
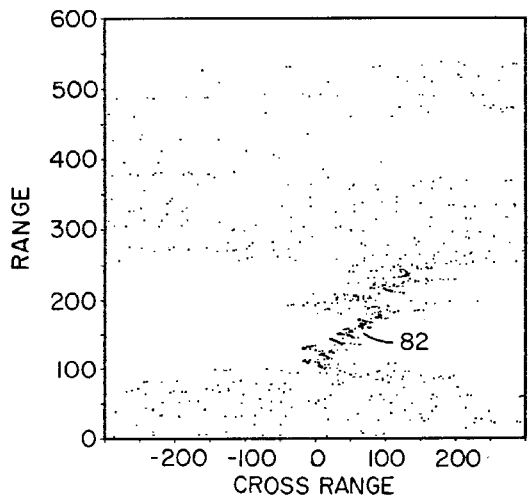
FIGS. 6, 7 and 8 are displays of the target of FIG. 5 using the prior art system and the system of this invention, respectively.
Figure 6:
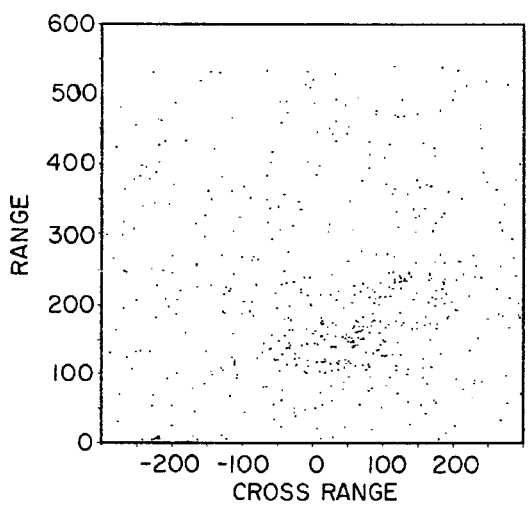
Figure 8:
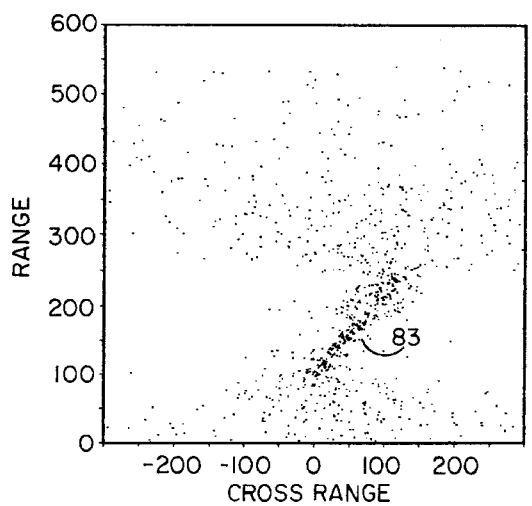

A system simulation was developed to gain information as to the performance of the processing technique of this invention. Artificial data was synthesized with a target model which characterizes multiple return target structure as shown in FIG. 5 where the target 80 highlights 81 are shown by the cross marks. The signal waveform was generated by forming the coherent sum of the signals from the scattering highlights. The transmit waveform chosen for the simulation was a hyperbolic frequency modulated waveform with frequency varying from 3250 Hz to 4250 Hz, and a time duration of 240 milliseconds. The aperture spacing of the phase displaced beams 12, 13 was set at $2\lambda$, where $\lambda$ is the wavelength of the center frequency of the transmitted band of frequencies. The processed outputs are shown on a two-dimensional, one-bit display of range versus cross-range (analogous to range-bearing maps) of the target 80 in a window of 600 yards by 600 yards. In order to assess the achievable processing gains on target imaging, the simulations were made with the number of segments M equal to 1 or 5 and input signal-to-noise ratios of 0 db or 20 db. The results are shown in FIGS. 6, 7 and 8 for SNR=0 db, M=1; SNR=0 db, M=5; and SNR=20 db, M=1, respectively. FIGS. 7, 8 demonstrate that the technique of this invention can be successfully used to provide remote active classification of targets 82, 83 with low frequency sonars.

Having described preferred embodiments of the invention, numerous other variations may now become apparent to those skilled in the art. It is felt, therefore, that this invention should not be limited in scope to the particular embodiments described above, but only by the spirit and scope of the following claims.

What is claimed is:

1. A sonar system for determining the bearing of a signal source providing a segmented signal comprising:

a sonar array providing a pair of offset-phase centered beams, said pair of beams being characterized as right and left phase displaced beams with respect to an axis through a phase center of said sonar array;

said right and left beams providing a right and a left phase displaced signal, respectively, from said signal source;

means providing a plurality of correlation products corresponding to the segments of said segmented signal of each of the right and left phase displaced sonar array output signals;

said correlation products each containing a pair of a real and an imaginary part; and means determining a bearing with respect to said axis of a source of said output signals from an argument derived from at least some of said pairs of correlation products.

2. The sonar system of claim 1 wherein said same pairs of correlation products is obtained from smoothed and data edited pairs of correlation products.

3. The system of claim 2 wherein said means for determining the bearing comprises:

means for smoothing and data editing said pairs of correlation products to disregard a predetermined number of said pairs which have values farthest from the center of the distribution curve of all of said pair values.

4. The system of claim 2 wherein said means determining the bearing comprises:

means averaging the sum of the real and the sum of the imaginary parts of a selected number of said pairs of correlation products; and means calculating the bearing of a source of said sonar array output signals from said averaged sum of said pairs.

5. The system of claim 2 wherein said means determining the bearing comprises:

means averaging the argument values of those values which are selected to include only those values falling within predetermined values; and means calculating the bearing of a source of said sonar array output signals from said averaged argument values.

6. The system of claim 4 wherein said means calculating the bearing of a source of said sonar array output signal applies the Horton phase factor to the arc tangent of the argument of said averaged sum of said real and imaginary pairs.

7. A sonar system comprising:

means providing a plurality of phase-center separated beams;

means providing a transmitted waveform having a time-bandwidth product;

means segmenting said transmitted waveform;

segmented replica correlator means each connected to one of said means providing said beams for receiving signals by said beams;

each said segmented replica correlator providing a plurality of outputs each corresponding to a segment;

multiplier means having inputs connected to corresponding outputs of each of said segmented replica correlators;

each said multiplier means providing a complex output signal having a real and imaginary part;

first means summing said real parts of said multiplier means output signals to provide a first output signal;

second means summing said imaginary parts of said multiplier means output signals to provide a second output signal;

means obtaining an argument of the first and second output signals; and means converting said argument into a bearing angle of said beam providing means.

8. The sonar system of claim 7 comprising in addition:

means delaying each of said complex output signals of said multiplier means, the delay provided to each of said delayed signals being such as to cause signals from each segment to be delayed to provide pulse compression.

9. The sonar system of claim 7 wherein said means obtaining the argument comprises means providing the arc tangent of said first and second output signals.

10. The sonar system of claim 7 wherein said first and second summing means comprises filter means selecting according to predetermined criteria only some of said multiplier means output signals.

11. A sonar system for determining the bearing of a signal source providing a segmented signal comprising:

an array of transducers providing a beam axis along which said signals from said signal source has zero phase difference in an output of each of a first and second array of transducers;

said first and second array providing offset-phase centered first and second beams which provide output signals with a relative phase difference for a signal source off said beam axis;

means providing a plurality of correlation products of the segmented signal from the first and second phase displaced sonar array output signals;

said correlation product containing a real and an imaginary part;

means providing an argument for each of said real and imaginary parts; and means determining a bearing of said source of said output signals from the argument derived from at least some of said pairs of correlation products.

* * * * *